United States Patent [19]
Kobayashi et al.

[11] 4,016,534
[45] Apr. 5, 1977

[54] INDICATOR DEVICE FOR AUTOMOBILES

[75] Inventors: Ikuya Kobayashi; Hiroshi Arai; Jun Ohta; Minoru Izawa, all of Aichi, Japan

[73] Assignee: Toyota Jidosha Kogyo Kabushiki Kaisha, Aichi, Japan

[22] Filed: Aug. 12, 1975

[21] Appl. No.: 603,806

[30] Foreign Application Priority Data

Aug. 30, 1974 Japan .............................. 49-99744
Aug. 30, 1974 Japan .............................. 49-99745
Sept. 19, 1974 Japan ............................. 49-107937

[52] U.S. Cl. .............................. 340/52 F; 340/380; 340/415
[51] Int. Cl.² ............................................. B60Q 1/00
[58] Field of Search ............. 340/52 F, 213 R, 266, 340/366 E, 366 F, 378 R, 380, 412, 414, 415

[56] References Cited
UNITED STATES PATENTS 2,751,584  6/1956  Isborn .............................. 340/380
3,728,673  4/1973  Werda .............................. 340/52 F Primary Examiner—Alvin H. Waring
Attorney, Agent, or Firm—Stevens, Davis, Miller & Mosher

[57] ABSTRACT

An indicator device for vehicles such as an automobile car which can show locations in a predetermined priority sequence if there is something wrong with various functions of the car, and comprises a plurality of indicating elements superposed in layers, each having a light source, light reflecting spots to represent a character and checking means for checking the light source, sensors for detecting changes in the functions, and an electrical control circuit actuated by signals from the sensors for energizing the light sources.

10 Claims, 8 Drawing Figures

INDICATOR DEVICE FOR AUTOMOBILES

BACKGROUND OF THE INVENTION

The present invention relates to an indicator device for automobiles which can show locations if there is something wrong with various functions installed through the car, and more particularly to an improved indicator device which can provide information in many different characters within its limited indicating area. For recent years, automatic control systems or automatic monitor systems have been developed and used in various fields such as vehicles. With the introduction of those systems, there arises a need for means by which the status or change of the different operating points of the systems can be provided in visual forms.

It is generally known that characters, symbols or patterns (hereinafter referred to as "characters") are the best means that can convey information in readable forms. When information is indicated in character forms, a relatively large area is required if the information must be provided in many different characters. If the indicating area must be limited or small, the known indicator device is practically useless.

The indicator device is usually installed on the front panel of the car, but must have its indicating area limited. There is also known a central alarm system actually installed in some types of vehicles for keeping the driver informed of the status of various functions installed through the car. As far as the known alarm system is concerned, the status of those functions should preferably be indicated by character forms which the driver can recognize as clearly as possible during the car driving. However, it is known that there are a great many instruments arranged on the front panel, and there is no space or area for installing the type of indicator which requires as many different indications as the many functions of the car. Furthermore, the known alarm system shows those locations by lighting an indicator plate on which there are provided as many indications as those locations. This makes it difficult for the driver to recognize those indications individually, and may lead to serious traffic accidents particularly when the driver gives his attention to the indicator device which shows a particular location usually indicated in small character sizes.

There is known an improved indicator which can provide many different indications within its limited indicating area. It includes a number of indicating elements formed by transparent or clear plates and superposed in layer arrangement, each of which has light reflecting spots arranged to represent a particular character and a light source on one side thereof which lights the light reflecting spots. In accordance with the indicator described above, it is possible to provide many different indications within the limited area. Therefore, it may serve as an indicator means for the central alarm system mentioned earlier. However, it has a disadvantage since it includes no means by which light sources can be checked for failure. When the indicator device is used for the alarm system, it is very important that the indicator and particularly the light sources should be checked previously before driving the car. If the inspection is made by lighting all indicating elements at a time, it makes it difficult or impossible to know which light source is wrong. In order to avoid this, therefore, the inspection must be carried out by lighting all elements one after another. Howevr, this makes the inspection work troublesome and time-consuming, resulting in overlooking some defective light sources. Because of its construction, the known indicator device has a further disadvantage: if two or more functions of the car become defective concurrently, all corresponding indicator elements are lighted at the same time, overlapping the indications indiscriminately. This is also true if two or more defective functions occur one immediately after another.

SUMMARY OF THE INVENTION

The present invention provides an improved indicator device over the prior indicators earlier mentioned, and has overcome their disadvantages.

It is therefore one object of the present invention to provide an improved indicator device which includes means by which all light sources or indicator elements can be checked for failure by lighting the indicator elements one at a time.

It is another object of the present invention to provide an improved indicator device which includes means which can selectively turn on the light sources in accordance with the priority or importance of the various functions installed throughout the car.

DESCRIPTION OF THE PREFERRED EMBODIMENTS

Figure 1:
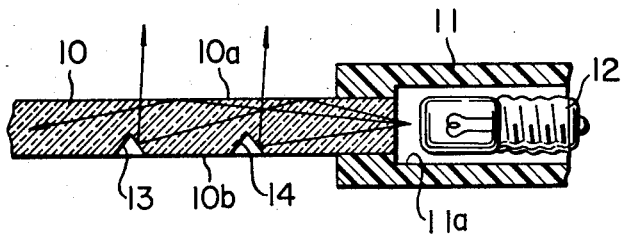
FIG. 1 is a sectional view illustrating the schematic construction of an indicator element according to the present invention.

The invention will further be described by way of several preferred embodiments thereof by reference to the accompanying drawings in which:

Referring first in FIG. 1, there is schematically shown the construction of an indicator element of an indicator device according to the present invention. As shown in detail in FIG. 1, an indicator plate 10 is provided in the form of a transparent or clear solid plate of glass or plastic material or preferably acryl resin, and has its opposite ends held by a supporting member 11. The supporting member 11 has a housing 11a in which a light source formed by a lamp 12 is rigidly secured. It is shown that the plate 10 has a flat surface 10a, but it may be of a curved surface. The side 10b opposite the surface 10a has hollow portions of conical or semiglobular form which act as light reflecting spots 13, 14. The spots are of a height which varies with the thickness of the plate 10. They should preferably have a height which ranges between 0.2 and 0.8 mm if the plate 10 is of 1 mm thickness, for example.

The light supplied by the lamp 12 enters the indicator plate 10 at angles indicated by arrows in FIG. 1, and hits the surfaces 10a and 10b at angles larger than the critical angles by which the beams of light are totally internally reflected. This results from the fact that the plate 10 is of a thickness smaller than the length thereof. When the light is totally internally reflected from the surfaces 10a and 10b, it will not pass through the plate 10. The light then hits the spots 13, 14, and is reflected so that it can transmit through the surface 10a of the plate 10. In this manner, lighted portions which correspond to the spots 13, 14 emerge on the surface 10a, producing a pattern of bright spots in the form of a particular character.

Figure 2:
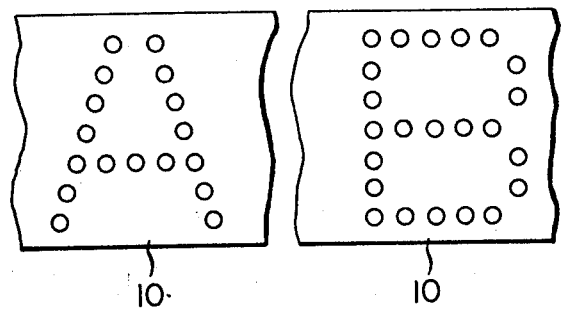
FIG. 2 is a front view of FIG. 1, showing two letters as lighted.

It will readily be understood from the foregoing description that information can be represented by particular characters or patterns if the light reflecting spots 13, 14 are arranged in any desired character or pattern forms. FIG. 2 shows two letters "A" and "B" thus formed and emerging on the surface 10a.

Figure 3:
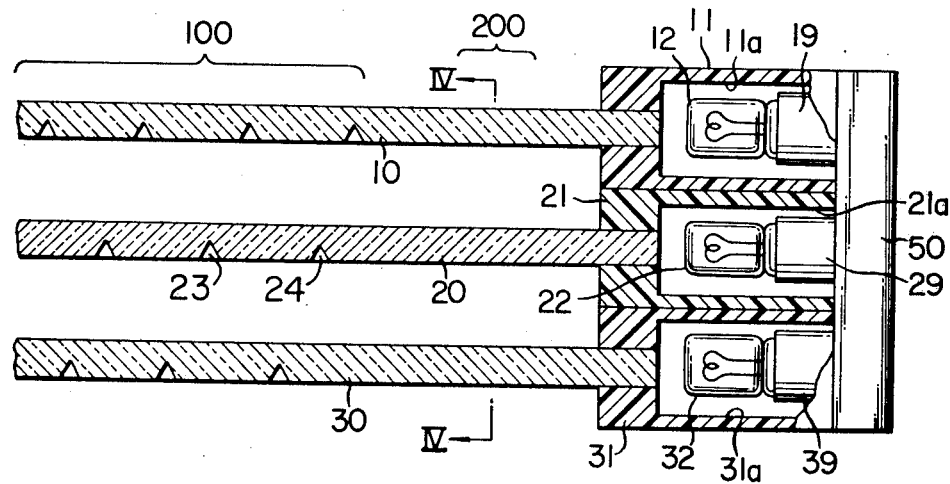
FIG. 3 is a sectional view of an indicator device embodying the invention, showing three indicating elements disposed in superposed layers.

Referring next to FIG. 3, there is shown an indicator device according to the invention, which has three indicating elements disposed in layers each having a different character formed by a desired number of light reflecting spots. In FIG. 3, light sources or lamps 12, 22 and 32 are provided in their respective lamp holders 19, 29 and 39 rigidly secured to a base member 50. The base member 50, though not shown internally, includes electrically wired portions, and connectors through which the light sources are connected with an external power supply and electrical control circuit which will be described later.

For the convenience of easy understanding, the following description is mainly directed to the indicating element shown in FIG. 3, but it applies to the two other elements. Those two elements have the same arrangement, and include the same component parts which can be referred to as numerals 2x and 3x, respectively.

The plates 10, 20 and 30 have a character indicating area 100 in which combinations of light reflecting spots each representing a particular character or pattern are provided. When any one of the light sources or lamps 12, 22, 32 is turned on, light from the source hits the light reflecting spots of the corresponding plate, and is reflected so that a character can emerge in the form of the bright spots on the surface 10a of the plate 10. If the light 29, for example, is turned on, the light from the light 29 hits the light reflecting spots 23, 24, and is reflected so that its beams can travel through the plate 20 and through the plate 10, emerging as a pattern of bright spots in the form of a character. In this instance, if the light reflecting spots of the plate 20 are individually arranged in slightly different positions from those of the plate 10 horizontally or perpendicular to the plane of the drawing, the beams of light from the plate 20 will not strike the spots of the plate 10, and therefore will not be reflected therefrom, travelling through the plate 10 without the influence of the spots of the plate 10.

The plate 30 has also light reflecting spots individually arranged in slightly different positions from those of the plates 10 and 20. Therefore, the beams of light from the plate 30 are not influenced by the spots of the plates 10 and 20, passing through the plates 10 and 20.

Figure 4:
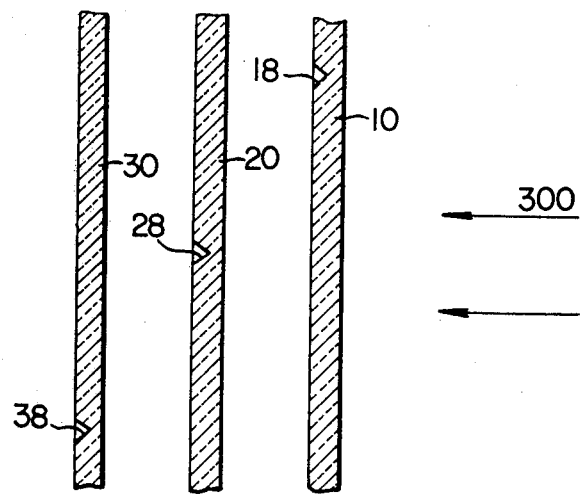
FIG. 4 is a sectional view taken along the line IV — IV in FIG. 3.

In addition, the plates 10, 20 and 30 have a checking mark area 200 located apart from the clearly distinguished from the character indicating area 100. As particularly seen from FIG. 4, the area 200 consists of a single light reflecting spot provided on each of the plates 10, 20 and 30 and which can serve as a checking mark. In the embodiment of FIG. 4, for example, the plate 10 has a light reflecting spot 18 of a hollow conical form. Similarly, the plates 20 and 30 have a spot 28, 38 of the same form. As easily understood from FIG. 4, it is very important that the spots 18, 28 and 38 should be located in different positions from each other with respect to the observer's eye 300. The indicator device is usually checked for failure by supplying signals from an external circuit to all light sources at the same time. Suppose that there is something wrong with any one of the light sources or indicating elements: if signals are supplied to all light sources, all lights are turned on altogether for lighting all corresponding indicating elements, and emerging characters are overlapped so confusingly that it is impossible to know which light is wrong.

In accordance with the indicator device illustrated above, the checking mark area 200 is provided in order to avoid the above problem. The area 200 is located apart from the character indicating area 100, and can be clearly distinguished from the area 100, serving as means by which any wrong light source or element can readily be checked. More particularly, as shown for example, the checking mark area 200 consists of single light reflecting spots 18, 28 and 38 provided on the plates 10, 20 and 30 and located in different positions from each other. Therefore, the spots 18, 28 and 38 can individually or separately be seen by the observer.

In the above embodiment, the indicator device of the three indicating elements or plates is shown, but it may be constructed of any desired number of elements or plates. The number of the elements may be increased depending on the use or application of the indicator device. In other words, the more elements there are, the greater the advantage or effect that the invention can provide.

In the embodiment described above, the checking mark area 200 has a single light reflecting spot provided for each plate, but the number of the spots may be increased to represent a particular character.

Figure 5:
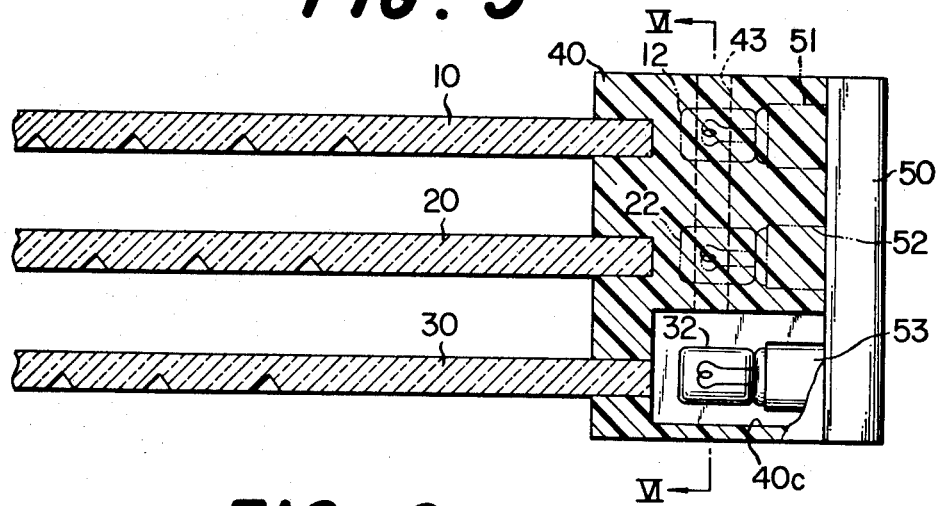
FIG. 5 is a sectional view of another indicator device embodying the invention, showing three indicating elements disposed in superposed layers.
Figure 6:
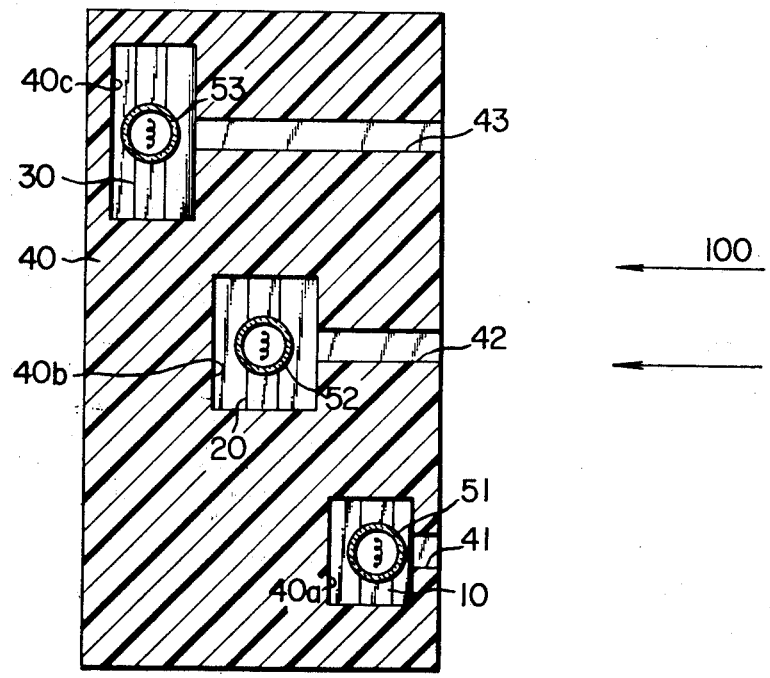
FIG. 6 is a sectional view taken along the line VI — VI in FIG. 5.

FIG. 5 indicates a varied embodiment of the invention, in which three plates 10, 20 and 30 are disposed like layers, each of which has light reflecting spots arranged to represent a particular character. As particularly shown in FIG. 5, the plates 10, 20 and 30 are held by a supporting member 40. Reference numeral 50 denotes a base member rigidly secured to the member 40, and lamp holders 51, 52 and 53 are rigidly secured to the base member 50. Reference numerals 40a, 40b and 40c denote housings provided in the member 40, in which lamps 12, 22 and 32 are arranged to form light sources. FIG. 6 is a sectional view taken along the line VI — VI in FIG. 5, in which holes 41, 42 and 43 are provided through the supporting member 40, leading to the housings 40a, 40b and 40c respectively, and serve as means for checking the light sources or lamps 51, 52 and 53. As seen from FIG. 6, the holes 41, 42 and 43 are located in different positions from each other with respect to the observer's eye. As the holes 41, 42 and 43 are thus arranged, the lamps 51, 52 and 53 can individually be viewed through the holes 41, 42 and 43 in order to check the light sources for failure. As described in the earlier embodiment of FIG. 3, signals are applied to all light sources at one time so that all lamps can be lighted. The disadvantage of the prior art mentioned earlier has been overcome by locating the holes 41, 42 and 43 in different positions from each other, so that the lamps can be checked all at one time. In the embodiment of FIGS. 5 and 6, the holes are provided in circular form, but may be formed in any other shape.

Figure 7:
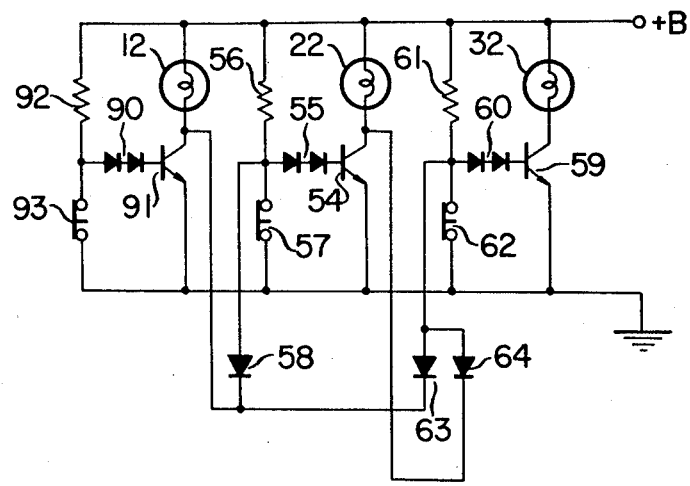
FIG. 7 is a schematic diagram of an electrical circuit embodying the invention for energizing the light sources in the predetermined sequence.

Referring next to FIG. 7, a circuit arrangement for actuating the light sources in a predetermined priority order is provided as a preferred embodiment of the invention. Suppose now that the plate 10 or light source 12 of the three shown in FIG. 3 corresponds to an operating function of the first importance or priority, the plate 20 or light source 22 to a function of the second importance, and the plate 30 or light source 32 to a function of the third importance. As shown in FIG. 7, the light source or lamp 12 which can supply light to the plate 10 has one terminal connected to a common power supply, and the other terminal connected to a collector of a transistor 91. The emitter of the transistor 91 is grounded, and its base is connected through a diode 90 to an intermediate point between a resistor 92 in series connection with the power supply, and a sensor 93. The sensor 93 is located at its corresponding function of the car, and can respond to changes in the function. It is normally closed when the function operates properly. In this status, the base of the transistor 91 is at ground potential, keeping the transistor 91 open so that the lamp 12 remains off.

Similarly, the light source or lamp 22 has one terminal connected to the power supply and the other terminal connected to the collector of a transistor 54. The emitter of the transistor 54 is grounded, and its base leads through a diode 55 to an intermediate point between a resistor 56 in series connection with the power supply, and a sensor 57. The anode of the diode 55 is connected through a diode 58 to the collector of the transistor 91. The sensor 57 can detect changes in its corresponding function, and is normally closed when the function operates properly, keeping the transistor 54 open so that the lamp 22 remains off.

The light source or lamp 32 for the plate 30 has one terminal connected to the power supply, and the other terminal connected to the collector of a transistor 59. The emitter of the transistor 59 is grounded, and its base leads through a diode 60 to an intermediate point between a resistor 61 in series connection with the power supply, and a sensor 62. The anode of the diode 60 leads through the diode 63 to the collector of the transistor 54. The sensor 62 can detect changes in its corresponding function, and is normally closed when the function operates properly, keeping the transistor 59 open so that the lamp 32 can be held off.

All above sensors 93, 57 and 62 include switching circuit means of any type, respectively. If there is something wrong with the switching circuit means, such as insufficient or poor contact, it will have an increased contact resistance which causes the corresponding light source to operate improperly. The diodes 90, 55 and 60 connected to the bases of the corresponding transistors 91, 54 and 59 can serve most suitably as level shifters to eliminate the above problem, and can avoid that the transistors 91, 54 and 59 be turned on if the sensors 93, 57 and 62 or corresponding switching means have the amount of contact resistance that may slightly increase as a result of the poor contact of the switching means.

Referring then to the circuit above illustrated, its operation will be described hereinafter: If the sensor 93 provided for detecting the operating function of the first importance or priority responds to any change in the function, and is then turned off, the transistor 91 will then have a current flow through the base thereof, causing the transistor 91 to be turned on for lighting the lamp 12 which can show the particular location. As a result, the base voltages of the transistors 54 and 59 are controlled through their respective diodes 58 and 62 to the collector voltage of the transistor 91 or ground potential. Even if any of the other sensors 57 and 62 should respond to changes in their respective functions, and it is then turned off, the transistor 54 or 59 is held off and keeps the lamp 12 lighted on for warning. It will be understood from the above that as long as the lamp 12 remains lighted on to indicate that the first-priority function is operating improperly, there is no need for lighting the other lamps 22 and 32 for the less important functions. As the sensor 93 is turned on after the first-priority function returns to normal, the transistor 91 is then turned off so that the lamp can be turned off. At the moment that the lamp 12 is turned off, the collector voltage of the transistor 91 will rise, setting the transistors 54 and 59 free from the restrained action. If any of the sensors 57 or 62 detects changes in its corresponding function, and is then turned off, the transistor 54 or 59 is turned on for lighting the lamp 22 or 32 for warning.

Similarly, the sensor 57 of the second priority is operated in the same manner: the transistor 54 is turned on, restraining the transistor 59 from action. However, if the first-priority sensor 93 should be turned off at any time during the period in which the sensor 57 is held off and the light 22 is lighted, causing the transistor 51 to be turned on, the transistor 54 would then be turned off, turning off the lamp 22 and turning the lamp 12 on again.

As is apparent from the preceding description, the sensor 62 of a further less importance always has its transistor 59 restrained from action by the two transistors 91 and 54, and the lamp 32 will be lighted only when the sensor 62 is turned off.

In accordance with the indicator device described above, light sources can be turned on in the predetermined priority sequence for lighting corresponding indicating elements in that sequence, so that so confusing overlapped information can be avoided.

The sensor circuit of the lower priority, temporarily held pending, can be turned on for lighting the lamp as soon as the function of the higher priority has returned to normal.

Figure 8:
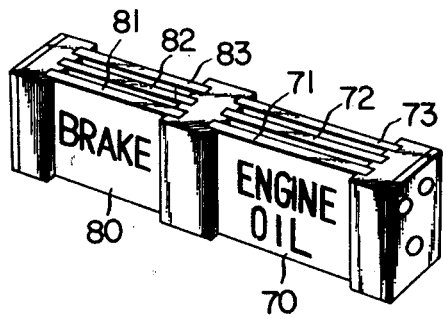
FIG. 8 is a perspective view of an indicator device according to the invention.

FIG. 8 indicates another preferred embodiment of the indicator device according to the invention. It includes two sections of indicating plates, a first section of three indicating plates 71, 72 and 73 disposed like layers, and a second section of three indicating plates 81, 82 and 83 disposed like layers. By grouping these plates into the two sections, it is possible to arrange them between the two sections in accordance with the function priority order, such as 71, 81, 72, 82, 73 and 83 in that order as shown. In this manner, it is possible to avoid having two plates for the functions of the same priority arranged in the same section, thereby giving information as to the two functions if there is something wrong with the two functions concurrently.

It should be understood that the invention has been described with reference to several preferred embodiments, and that various changes and modifications may be made without departing from the scope and spirit of the invention.

We claim:

1. An indicator device for indicating abnormalities in apparatus such as motor vehicles which comprises:
    a plurality of abnormality sensor means respectively disposed at functional parts or objects in the apparatus, each of said sensor means for detecting abnormalities at said parts and for converting the occurrence of an abnormality into an electric signal;
    a plurality of corresponding display lamps respectively connected to respective abnormality sensor means;
    a plurality of switching circuit means for engaging the respective display lamps in response to signals from the abnormality sensor means;
    a priority sequence determination circuit means for determining a priority order among the detection signals whereby abnormalities occurring at two or more functional parts simultaneously result in one of said display lamps corresponding to the detection signal of a higher priority being selectively energized; and
    a plurality of indicating elements of transparent and light transmissible material arranged in layers, each of said indicating elements having thereon light reflecting means, each display lamp each being disposed, respectively, at the edge of one of the respective indicating elements.

2. The indicator device of claim 17, wherein said priority sequence determination circuit means includes switching circuit means each having an input terminal connected to a respective sensor means each corresponding to each switching circuit means, and bypass circuit means provided between the output terminal of each said switching circuit means and leading to a higher priority light source and to the input terminal of each switching circuit means and leading to a lower-priority light source.

3. The indicator device of claim 2, wherein said bypass circuit means include diode means.

4. The indicator device of claim 2, wherein said switching circuit means include transistor means.

5. An indicator device, for providing a visual warning of functional faults in an apparatus to be monitored, such as a motor vehicle comprising:
    a plurality of indicating elements of transparent and light transmissible material disposed like superposed layers and each having a character indicating area provided with a plurality of light reflecting means for reflecting light from within each layer so that its character is visible from without the layer.
    a supporting frame member rigidly supporting said plurality of indicating elements superposed like layers;
    corresponding light sources provided on one edge of each of said plurality of indicating elements for supplying light to and through each of said plurality of indicating elements opposite said light sources, said light sources being held by holding members;
    a plurality of sensor means provided at a corresponding plurality of functions of the apparatus to be monitored for detecting changes in said corresponding functions;
    a corresponding plurality of drive circuit means respectively individually actuatable by signals from respective sensor means for supplying electric current to respective light sources; and
    checking means comprising light conducting means for directing light from each light source to a monitoring location, said light conducting means being arranged in different positions from each other as viewed at the monitoring location so that by energizing all of said light sources all at the same time, simultaneous checking on the status of each light source is attained.

6. The indicator device of claim 5, wherein one of said light transmitting means is formed in each of the indicating elements and constitutes a checking mark area of light reflecting means distinct from and not a part of said character indicating area.

7. The indicator device of claim 6, wherein said checking mark area comprises a hollow volume of conical form provided in each of said plurality of indicating elements.

8. The indicator device of claim 5, wherein said light sources are electric lights held within said supporting member and arranged in different positions from each other as viewed at the monitoring location, and said light conducting means of the checking means includes through-holes provided through said supporting member and leading to each of said light sources opposite said through-holes.

9. The indicator device of clalim 8, wherein said through-holes lead to housing provided in said supporting member and in which said electric lights are secured.

10. The indicator device of claim 5, wherein the apparatus to be monitored is a motor vehicle and the monitoring apparatus to be monitored is a motor vehicle and the monitoring location is a control panel of the vehicle.

* * * * *